(12) United States Patent
O'Rourke et al.

(10) Patent No.: US 7,409,706 B1
(45) Date of Patent: Aug. 5, 2008

(54) SYSTEM AND METHOD FOR PROVIDING PATH PROTECTION OF COMPUTER NETWORK TRAFFIC

(75) Inventors: Chris O'Rourke, Apex, NC (US); Robert M. Batz, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 801 days.

(21) Appl. No.: 09/970,364

(22) Filed: Oct. 2, 2001

(51) Int. Cl.
G06F 17/00 (2006.01)

(52) U.S. Cl. .................. 726/11; 726/13; 718/105

(58) Field of Classification Search .............. 714/4, 714/10; 726/11, 13; 718/105
See application file for complete search history.

(56) References Cited

U.S. PATENT DOCUMENTS

| | | | |
|---|---|---|---|
| 5,283,897 | A | 2/1994 | Georgiadis et al. |
| 5,539,883 | A | 7/1996 | Allon et al. |
| 5,881,284 | A | 3/1999 | Kubo |
| 5,936,951 | A * | 8/1999 | Andersson et al. ........ 370/351 |
| 5,959,989 | A * | 9/1999 | Gleeson et al. .......... 370/390 |
| 6,128,657 | A | 10/2000 | Okanoya et al. |
| 6,185,601 | B1 | 2/2001 | Wolff |
| 6,374,297 | B1 | 4/2002 | Wolf et al. |
| 6,421,688 | B1 | 7/2002 | Song |
| 6,496,935 | B1 | 12/2002 | Fink et al. |
| 6,560,717 | B1 | 5/2003 | Scott et al. |
| 6,581,104 | B1 | 6/2003 | Bereiter |
| 6,601,084 | B1 | 7/2003 | Bhaskaran et al. |
| 6,650,621 | B1 * | 11/2003 | Maki-Kullas .............. 370/238 |
| 6,775,235 | B2 * | 8/2004 | Datta et al. ............... 370/238 |
| 6,779,039 | B1 | 8/2004 | Bommareddy et al. |
| 6,880,089 | B1 * | 4/2005 | Bommareddy et al. ...... 726/11 |
| 7,055,173 | B1 * | 5/2006 | Chaganty et al. ........... 726/11 |
| 2001/0027491 | A1 * | 10/2001 | Terretta et al. ............ 709/238 |
| 2002/0073337 | A1 * | 6/2002 | Ioele et al. ............... 713/201 |

OTHER PUBLICATIONS

Jones (Vincent C. Jones, "Configuration for Transparently Redundant Firewalls", May 2001)☐☐.*
Valzah (Robert A. Van Valzah, "Border Router Selection", Apr. 2001).*
Boyles et al. (Tim Boyles and David Hucaby, "CCNP Switching Exam Certification Guide", Dec. 2000, ISBN: 978-1-58720-0000-7).*
Microsoft Press (Microsoft Press, "Microsoft Windows 2000 Server Internetworking Guide", Jan. 2000, ISBN 678-1-57231-805-2).*
Yerxa, Radware FireProof Balances Firewall Loads With Minimal Complexity, Apr. 1999.*
Network Press, Encyclopedia of Networking, 2nd Edition, ISBN: 0782118291, 1995.*

* cited by examiner

*Primary Examiner*—Kambiz Zand
*Assistant Examiner*—Peter Poltorak
(74) *Attorney, Agent, or Firm*—Baker Botts L.L.P.

(57) ABSTRACT

A computer network includes an inside network and an external network. The inside network may communicate with the external network over a first path through a first inner load balancer, a first set of firewalls, and a second outer load balancer. The inside network may also communicate with the external network over a second path through a second inner load balancer, a second set of firewalls, and a second outer load balancer. In normal operating conditions, traffic is flowing on both the first and second paths. Probes are passed over each path to monitor the operating status of the path. If a failure occurs in the first inner load balancer, its operating status is changed to standby and the second inner load balancer becomes active for the traffic previously handled by the first inner load balancer. The associated first outer load balancer, recognizing that a probe has not been received to indicate an operating state of the first path, changes its state to standby so that the second outer load balancer becomes active for the traffic previously handled by the first outer load balancer.

19 Claims, 2 Drawing Sheets

SYSTEM AND METHOD FOR PROVIDING PATH PROTECTION OF COMPUTER NETWORK TRAFFIC

TECHNICAL FIELD OF THE INVENTION

The present invention relates in general to computer information processing and more particularly to a system and method for providing path protection of computer network traffic.

BACKGROUND OF THE INVENTION

Network topologies that use a single firewall between a secure internal network and an external network can create a performance bottleneck and a single point of failure. The single firewall may be replaced by a bank of firewalls to increase throughput and provide redundancy. Moreover, network devices such as firewall load balancers can balance the traffic flow across the firewalls in the bank. Firewall load balancers are typically placed on either side of the bank of firewalls between the secure internal network and the external network. A network design with a single firewall load balancer on each side of the bank of firewalls results in two single points of failure at the inside network firewall load balancer and the outside network firewall load balancer.

Conventional firewall load balancing solutions offer an active-passive redundancy design to eliminate single points of failure that may affect the performance of the network. With active-passive redundancy, there are at least two firewall load balancers on each side of the bank of firewalls. For example, a first inside network firewall load balancer handles the traffic flow while a second inside network firewall load balancer is in a standby mode and does not handle traffic unless a failure occurs in the first inside network firewall load balancer. A hot standby routing protocol (HSRP), or other similar protocols, may be used to change the active/standby status of each inside network firewall load balancer. The second inside network firewall load balancer will pick up the traffic flow to and from the inside network. By changing the operating status of the first inside network load balancer from active to standby and the second inside network firewall load balancer from standby to active, typically there is no affect on the active and standby status of first and second outside network firewall load balancers.

Active-passive network designs leave network devices sitting idle. Idle devices are a waste of resources. Additionally, concerns exist that the standby load balancer may not load balance correctly when it becomes active due to misconfigurations, wiring problems, or other possible failures. Therefore, it is desirable to provide failure protection for network traffic without having idle devices in the network design.

SUMMARY OF THE INVENTION

From the foregoing, it may be appreciated by those skilled in the art that a need has arisen for a network design that utilizes all network devices and provides path protection for network traffic. In accordance with the present invention, a system and method for providing path protection for computer network traffic are provided that substantially eliminate or greatly reduce disadvantages and problems associated with conventional active-passive network designs.

According to an embodiment of the present invention there is provided a system for providing path protection for computer network traffic that includes a first outer load balancer operable to handle a portion of network traffic and a second outer load balancer operable to handle a second portion of the network traffic. A plurality of firewalls provide secured routing of the first and second portions of the network traffic. A first inner load balancer provides the first portion of the network traffic to an inside network. A second inner load balancer provides the second portion of the network traffic to the inside network. The first and second outer load balancers can send a probe to the respective first and second inner load balancers. The probes determine an operating state of the first and second inner load balancers and the plurality of firewalls. A failure in one of the first and second inner load balancers will force the appropriate portion of the network traffic to flow through the operational inner load balancer.

The present invention provides various technical advantages over conventional active-passive network designs. For example, one technical advantage is providing an active-active network design, where all devices are handling traffic if no network failures have occurred. Another technical advantage is to provide path protection in an active-active network design. Yet another technical advantage is to determine operating states of devices in a network. Other technical advantages may be readily ascertainable by those skilled in the art from the following figures, description, and claims.

BRIEF DESCRIPTION OF THE DRAWINGS

For a more complete understanding of the present invention, reference is now made to the following description taken in conjunction with the accompanying drawings, wherein like reference numbers represent like parts, in which.

DETAILED DESCRIPTION OF THE INVENTION

Figure 1:
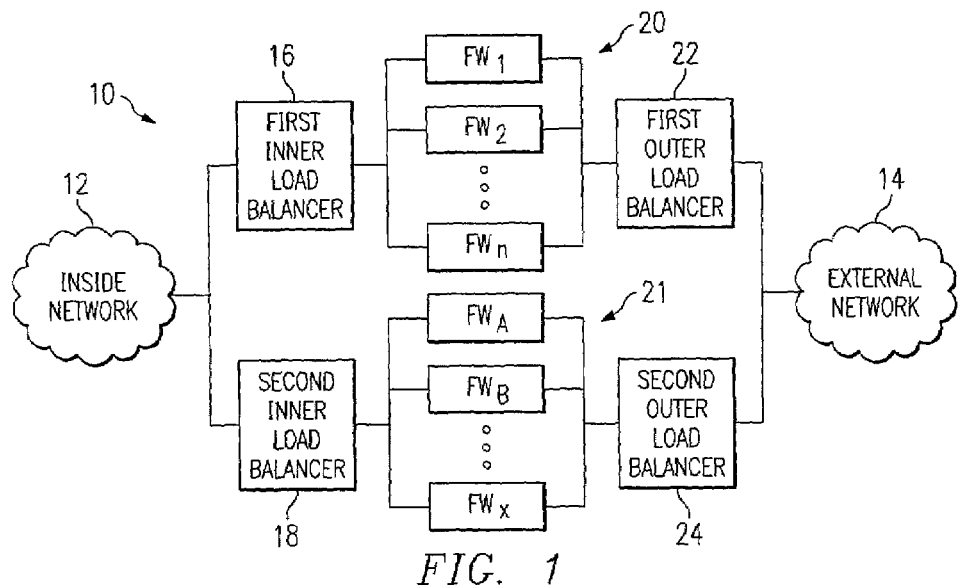
FIG. 1 illustrates a simplified block diagram of a computer network.

FIG. 1 is a block diagram of a computer network 10. Computer network 10 includes an inside network 12 and an external network 14. In between, a first inner load balancer 16 and a second inner load balancer 18 couple inside network 12 to a first set of firewalls 20 and a second set of firewalls 21, respectively. A first outer load balancer 22 and a second outer load balancer 24 couple external network 14 to firewalls 20 and firewalls 21, respectively. Firewall sets 20 and 21 provide for secure routing of traffic between inside network 12 and external network 14. Computer network 10 provides an active-active redundancy scheme so that all load balancers and firewalls are handling traffic under normal operating conditions. In this manner, no devices are sitting idle as in an active-passive redundancy design.

The active-active redundancy scheme is accomplished in a flow balancing environment by partitioning the traffic between the load balancers on each side of the sets of firewalls 20 and 21. Inside network 12 and external network 14 are configured with policy routing so that certain traffic flows can be consistently diverted to particular load balancers. For example, first outer load balancer 22 handles traffic from external network 14 having an odd source Internet Protocol (IP) address and act as a standby platform for traffic from external network 14 having an even source IP address. Similarly second outer load balancer 24 handles traffic from external network 14 having an even source IP address and acts as a standby platform for traffic from external network 14 having an odd source IP address. First inner load balancer 16 may handle traffic from inside network 12 having an odd destination IP address and act as a standby platform for traffic from inside network 12 having an even destination IP address. Second inner load balancer 18 may handle traffic from inside network 12 having an even destination IP address and act as a standby platform for traffic from inside network 12 having an odd destination IP address. Though described as using source and destination IP addresses to partition the traffic, other addressing schemes and traffic parameters may be used to accomplish an appropriate partitioning technique.

Computer network 10 may use HSRP in conjunction with policy routing to direct flows to the correct load balancer during failure conditions. The HSRP can detect the failure of a primary local firewall load balancer and redirect traffic to the standby local firewall load balancer. The HSRP cannot detect the failure of a remote primary firewall load balancer associated with the primary local firewall load balancer or the set of firewalls 20 or 21 associated therewith that are in the path to the other network.

Figure 2:
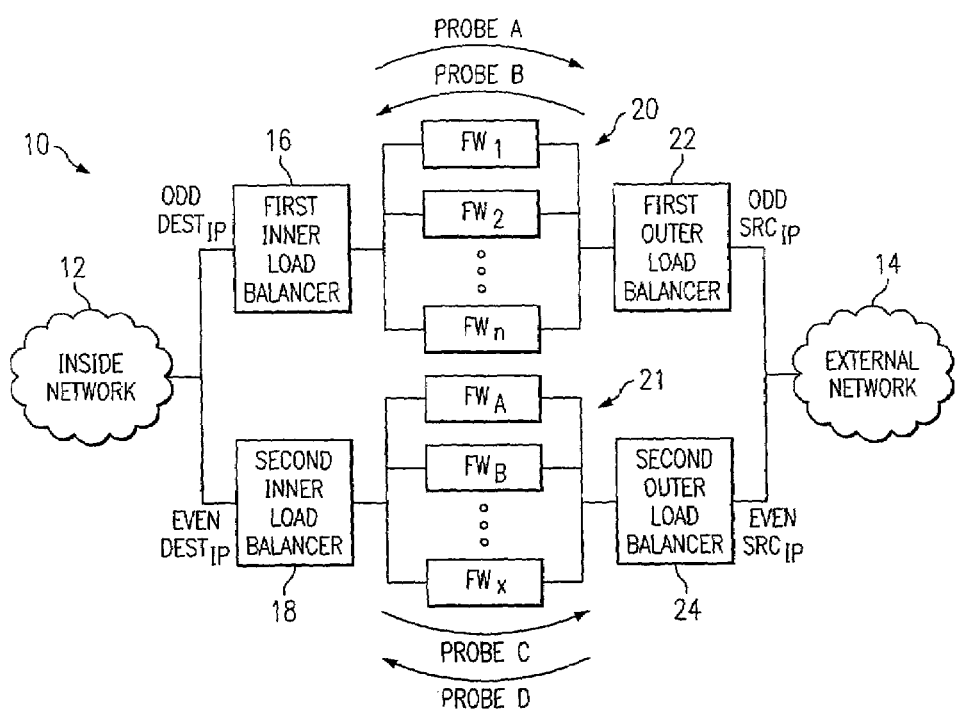
FIG. 2 illustrates a block diagram of probe transport in the computer network.

FIG. 2 shows how the operating status of the paths between inside network 12 and external network 14 are monitored. In order to determine the operating status of the path between first inner load balancer 16 and first outer load balancer 22, as well as between second inner load balancer 18 and second outer load balancer 24, probes are passed between associated load balancers in order to monitor the path therebetween across firewalls 20 and 21. Probes A and B pass back and forth between first inner load balancer 16 and first outer load balancer 22. Probes C and D are passed between second inner load balancer 18 and second outer load balancer 24. Probes may be generated by and/or traverse through inside network 12 and/or external network 14. Probes may be passed within computer network 10 at any time and triggered upon any occurrence, though a periodic probe transfer implementation may provide a more continues depiction of the operating status of the paths between inside network 12 and external network 14. If a load balancer does not receive its appropriate probe responses, then either its associated remote load balancer or all of the associated firewalls 20 or 21 are in a failure condition. Any of the load balancers can detect a failure in a single one of the firewalls 20 or 21 associated therewith and route the traffic away from the failed firewall to any of the operating firewalls as desired. When all firewalls fail or when an associated remote firewall load balancer fails, the operating local firewall load balancer assumes that its associated remote counterpart is in a failure condition and changes its HSRP state to standby.

Figure 3:
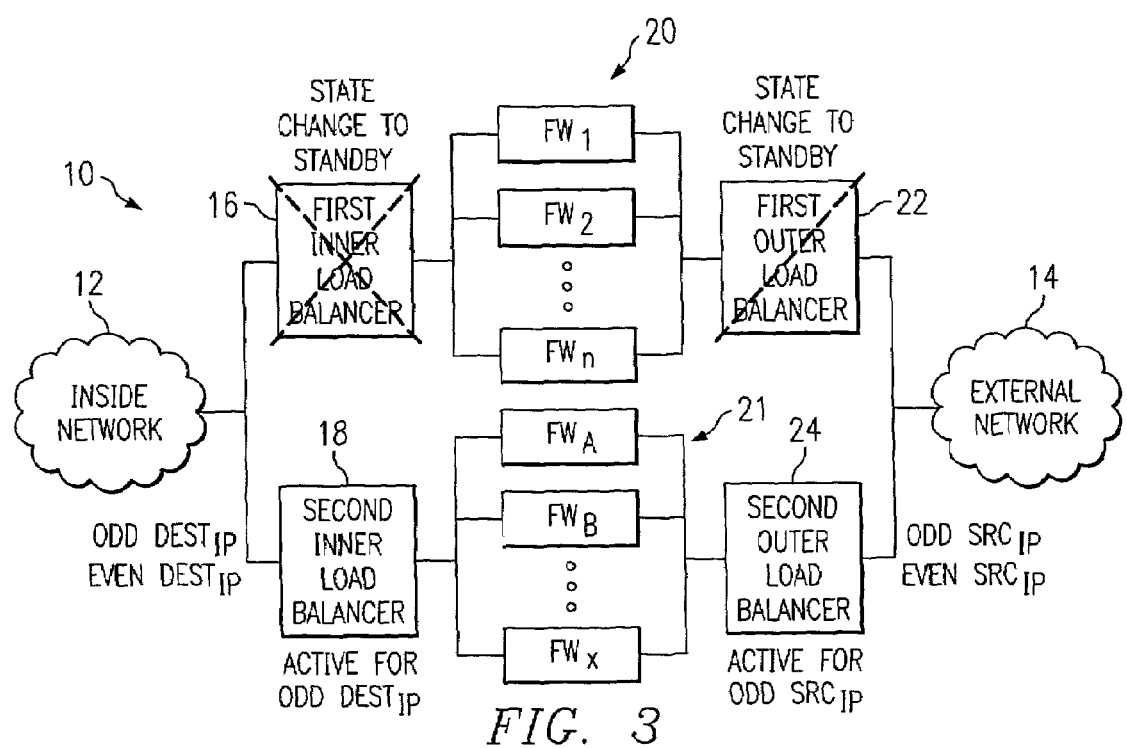
FIG. 3 illustrates a block diagram of a failure scenario in the computer network.

FIG. 3 shows an example of computer network 10 when a device is in a failure condition. If a failure occurs in first inner load balancer 16, an HSRP state change occurs to place first inner load balancer 16 into standby for traffic from inside network 12 with odd destination IP addresses. The HSRP state of second inner load balancer 18 is changed to primary for traffic from inside network 12 with odd destination IP addresses. Second inner load balancer 18 now handles traffic with both odd and even destination IP addresses. First outer load balancer 22, after not receiving the appropriate probe from first inner load balancer 16, notices a failure condition in the path to inside network 12. First outer load balancer 22 changes its HSRP state to standby for traffic from external network 14 with odd source IP addresses. Traffic from external network 14 with odd source IP addresses is then policy routed to second outer load balancer 24. Second outer load balancer 24 is now the primary load balancer for all even and odd source IP addressed traffic from external network 14. The traffic now flows between inside network 12 and external network 14 through second inner load balancer 18 and second outer load balancer 24 during this failure condition.

When the failure condition is resolved, first inner load balancer 16 may change its HSRP state to active for traffic from inside network 12 with odd destination IP addresses and send its probe to first outer load balancer 22. Upon receiving the probe, first outer load balancer 22 may change its HSRP state back to active for traffic from external network 14 with odd source IP addresses. The HSRP state for second inner load balancer 18 and second outer load balancer 24 is returned to standby for the respective odd destination and source IP addresses. A path is then restored between inside network 12 and external network 14 through first inner load balancer 16 and first outer load balancer 22.

Thus, it is apparent that there has been provided, in accordance with the present invention, a system and method for providing path protection of computer network traffic are provided that satisfy the advantages set forth above. Although the present invention has been described in detail, it should be understood that various changes, substitutions, and alterations may be made herein. For example, the discussed with respect to a hot standby routing protocol, other protocols that adjust the active and standby status of a device in a network may be used with equal effectiveness. Other examples may be readily ascertainable by those skilled in the art and may be made herein without departing from the spirit and scope of the present invention as defined by the following claims.

What is claimed is:

1. A system for providing path protection for computer network traffic, comprising:
    a first outer load balancer operable to handle a first portion of network traffic from an external network;
    a second outer load balancer operable to handle a second portion of the network traffic from the external network;
    a first inner load balancer operable to provide the first portion of the network traffic to an inside network, wherein the first portion of the network traffic from the external network has only odd numbered source addresses and the second portion of the network traffic from the external network has only even numbered source addresses;
    a second inner load balancer operable to provide the second portion of the network traffic from the external network to the inside network;
    a first group of firewalls operable to provide secured routing of network traffic only from the first outer load balancer to the first inner load balancer;
    a second group of firewalls operable to provide secured routing of network traffic only from the second outer load balancer to the second inner load balancer;
    each of the inner and outer load balancers operable to individually detect a firewall failure in the respective first and second groups of firewalls;
    wherein the first and second outer load balancers are operable to send probes to the respective first and second inner load balancers, the first and second outer load balancers operable to determine an operating state of the first and second inner load balancers in response to the probes.

2. The system of claim 1, wherein the first and second outer load balancers receive the respective first and second portions of the network traffic from the external network in accordance with a hot standby routing protocol.

3. The system of claim 1, wherein the first outer load balancer determines that a failure has occurred in the first inner load balancer, the first outer load balancer operable to adjust its traffic flow routing such that the first portion of the network traffic from the external network is handled by the second outer load balancer and the second inner load balancer.

4. The system of claim 3, wherein the first outer load balancer determines that there is no longer a failure condition in the first inner load balancer, the first outer load balancer operable to adjust its traffic flow routing so that the first portion of the network traffic from the external network is once again handled by the first outer load balancer and the first inner load balancer.

5. The system of claim 1, wherein the first inner load balancer is operable to receive traffic from the inside network having only an odd numbered destination address, the second inner load balancer operable to receive traffic from the inside network having only an even numbered destination address, the first outer load balancer operable to provide traffic with the odd numbered destination address to an external network, the second outer load balancer operable to provide traffic with the even numbered destination address to the external network.

6. The system of claim 5, wherein the first inner load balancer is operable to adjust its operational state to standby in response to an error condition therein, the second inner load balancer operable to adjust its operational state to active for traffic with the odd numbered destination address.

7. The system of claim 6, wherein the first outer load balancer identifies an error condition in the first inner load balancer according to one of the probes.

8. A method for providing path protection for computer network traffic, comprising:
   determining an operational status of all devices on a first path and a second path;
   providing separation of devices on the first path from devices on the second path;
   processing a first portion of traffic from an inside network only on the first path in response to devices on the first path being in an operational state;
   processing a second portion of traffic from the inside network only on the second path in response to devices on the second path being in an operational state, wherein the first portion of the network traffic from the inside network is associated with only odd numbered destination addresses and the second portion of the network traffic from the inside network is associated with only even numbered destination addresses;
   securely routing the first portion of traffic from the inside network on the first path;
   securely routing the second portion of traffic from the inside network on the second path;
   providing the first portion of traffic from the inside network transported only on the first path to an external network;
   providing the second portion of the traffic from the inside network transported only on the second path to the external network.

9. The method of claim 8, further comprising:
   receiving the first portion of traffic from the inside network only on the second path in response to any device on the first path being in a non-operational state.

10. The method of claim 9, further comprising:
    securely routing the first portion of the traffic from the inside network with the second portion of the traffic from the inside network only on the second path.

11. The method of claim 10, further comprising:
    providing the first portion of traffic from the inside network with the second portion of the traffic from the inside network only on the second path to an external network.

12. The method of claim 8, further comprising:
    processing a first portion of traffic from the external network only on the first path in response to devices on the first path being in an operational state;
    processing a second portion of traffic from the external network only on the second path in response to devices on the second path being in an operational state.

13. The method of claim 12, further comprising:
    processing the first portion of traffic from the inside network on the second path with the second portion of the traffic from the inside network in response to any device on the first path being in a non-operational state;
    processing the first portion of traffic from the external network on the second path with the second portion of the traffic from the external network in response to the first portion of traffic from the inside network being processed on the second path.

14. The method of claim 12, further comprising:
    receiving the first portion of traffic from the external network only on the second path with the second portion of the traffic from the external network in response to any device on the first path being in a non-operational state.

15. A system for providing path protection for computer network traffic, comprising:
    means for determining an operational status of all devices on a first path and a second path;
    means for providing separation of devices on the first path from devices on the second path;
    means for receiving a first portion of traffic from an inside network only on the first path in response to devices on the first path being in an operational state;
    means for receiving a second portion of traffic from the inside network only on the second path in response to devices on the second path being in an operational state, wherein the first portion of traffic from the inside network is associated with only odd numbered destination addresses and the second portion of traffic from the inside network is associated with only even numbered destination addresses;
    means for securely routing the first portion of traffic from the inside network on the first path;
    means for securely routing the second portion of traffic from the inside network on the second path;
    means for providing the first portion of traffic from the inside network transported only on the first path to an external network;
    means for providing the second portion of the traffic from the inside network transported only on the second path to the external network.

16. The system of claim 15, further comprising:
    means for receiving the first portion of traffic from the inside network on the second path in response to any device on the first path being in a non-operational state.

17. The method system of claim 15, further comprising:
    means for receiving a first portion of traffic from the external network on the first path in response to devices on the first path being in an operational state;
    means for receiving a second portion of traffic from the external network on the second path in response to devices on the second path being in an operational state;
    means for receiving the first portion of traffic from the external network on the second path in response to any device on the first path being in a non-operational state.

18. A system for providing path protection for computer network traffic, comprising:
    a first outer load balancer associated with a first set of firewalls and a first inner load balancer on a first path between an external network and an inside network, the first outer load balancer operable to provide traffic from the inside network received only through the first inner load balancer and the first set of firewalls on the first path to the external network;

a second outer load balancer associated with a second set of firewalls and a second inner load balancer on a second path between the external network and the inside network, the second outer load balancer operable to provide traffic from the inside network received only through the second inner load balancer and the second set of firewalls on the second path to the external network;

wherein traffic from the inside network on the first path is associated with only odd numbered destination addresses and traffic from the inside network on the second path is associated with only even numbered destination addresses;

wherein the first outer load balancer is operable to adjust its traffic flow routing in response to a failure condition associated with the inner load balancer on the first path so that all traffic from the inside network is received by the second outer load balancer.

19. The system of claim 18, wherein the first outer load balancer is operable to adjust its traffic flow routing in response to probes checking the operational state of devices on the first path.

* * * * *